United States Patent
Kitagawa et al.

(10) Patent No.: US 6,871,046 B2
(45) Date of Patent: Mar. 22, 2005

(54) RADIO TRANSMITTING APPARATUS AND RADIO TRANSMITTING METHOD

(75) Inventors: Keiichi Kitagawa, Yokosuka (JP); Mitsuru Uesugi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 123 days.

(21) Appl. No.: 10/168,961

(22) PCT Filed: Oct. 26, 2001

(86) PCT No.: PCT/JP01/09428

§ 371 (c)(1),
(2), (4) Date: Jun. 25, 2002

(87) PCT Pub. No.: WO02/37722

PCT Pub. Date: May 10, 2002

(65) Prior Publication Data

US 2002/0193070 A1 Dec. 19, 2002

(30) Foreign Application Priority Data

Nov. 1, 2000 (JP) ............................ 2000-334451

(51) Int. Cl.[7] .............................................. H04B 7/14
(52) U.S. Cl. .......................... 455/17; 455/23; 375/219; 370/203
(58) Field of Search .......................... 455/108, 17, 23; 375/219, 260; 370/203, 210

(56) References Cited

U.S. PATENT DOCUMENTS

| 5,584,057 | A | * | 12/1996 | Dent | 455/101 |
| 6,246,698 | B1 | * | 6/2001 | Kumar | 370/487 |
| 6,272,190 | B1 | * | 8/2001 | Campana, Jr. | 375/347 |
| 6,549,566 | B1 | * | 4/2003 | Lee et al. | 375/219 |
| 6,654,431 | B1 | * | 11/2003 | Barton et al. | 375/346 |

FOREIGN PATENT DOCUMENTS

| JP | 08265184 | 10/1996 |
| JP | 09275386 | 10/1997 |
| JP | 10173625 | 6/1998 |
| JP | 11017644 | 1/1999 |
| JP | 11215094 | 8/1999 |
| JP | 2002009734 | 1/2002 |
| JP | 2002016577 | 1/2002 |

OTHER PUBLICATIONS

International Search Report dated Jan. 29, 2002.

M. Motegi, et al., "A Study on Oputimum Combination of Modulation Schems for Sub BAND Type of OFDM System", Technical Report of IEICE, RCS 99–84, ppgs. 47–52, Aug. 26, 1999 with English Abstract.

F. Kojima, et al., "A Study on Adaptive Sub–Carriers Control Scheme for OFDM Cellular System", Technical Report of IEICE, RCS 99–83, ppgs. 41–46, Aug. 26, 1999 with English Abstract.

T. Shibata, et al., "A Channel Control Scheme Using Channel State Information in Multi–Carrier Transmission", Tokyo Central Research and Development Laboratories, Inc., Nagoya University, School of Engineering, B–5–23, p. 387, Mar. 6, 1996 with partial translation.

\* cited by examiner

*Primary Examiner*—David Hudspeth
*Assistant Examiner*—S. Smith
(74) *Attorney, Agent, or Firm*—Stevens, Davis, Miller & Mosher, LLP

(57) ABSTRACT

Channel fluctuation estimating section 101 estimates fluctuation amount of the channel between transmitting apparatus 100 and receiving apparatus 200, and carrier number determining section 102 determines the number of subcarriers used in transmission of signal based on channel fluctuation amount. That is to say, in the case of a remarkably rapid channel fluctuation caused by fast fading, etc., carrier number determining section 102 deduces relatively the channel fluctuation between symbols or within a burst, by decreasing the subcarriers number and increasing symbol rate per one subcarrier.

11 Claims, 8 Drawing Sheets

US 6,871,046 B2

RADIO TRANSMITTING APPARATUS AND RADIO TRANSMITTING METHOD

TECHNICAL FIELD

The present invention relates to a radio transmission apparatus and radio transmission method using a multicarrier modulation method.

BACKGROUND ART

In a radio communication system, a receiver receives simultaneously a signal which arrives directly (direct wave) from a transmitter and a signal which arrives after being reflected by obstacles (delay wave). Therefore, a frequency selective fading is generated due to multipath and hence reception quality is deteriorated.

In a multicarrier modulation, on the other hand, after dividing serial transmission data sequence into N pieces of data by serial to parallel conversion, each piece of data is modulated by a subcarrier wave of different frequency. Thus, even if the frequency selective fading due to multipath is generated, the probability that all data is lost can be reduced because transmission data is transmitted after being divided into a plurality of subcarrier waves of different frequencies in the multicarrier modulation method. That is, if the multicarrier modulation method is used, it will be hard to receive the influence of frequency selective fading.

However, because the symbol period is long in the aforementioned conventional multicarrier modulation method, the phase rotations and amplitude variations between symbols become relatively large. Consequently, in the case of a remarkably rapid fluctuation of the channel caused by fast fading, etc., the problem occurs that the channel estimation by an adaptive equalizer, etc., cannot fully follow the channel fluctuation which generates a deterioration of error characteristics.

DISCLOSURE OF THE INVENTION

It is an object of the present invention to provide a radio transmission apparatus and radio transmission method which can keep a preferable good communication quality without reducing the transmission data rate even in the case of remarkably rapid fluctuation of radio channel in radio transmission apparatus and radio transmission method using a multicarrier modulation technique.

The inventors of the present invention reach the present invention by paying attention to the relation between the number of subcarrier waves and the length of symbol period per one subcarrier wave in a multicarrier modulation and finding out that symbol period per one subcarrier wave can be shortened by reducing the number of subcarrier waves when constant and fixed bandwidth is set.

Then, in order to achieve the aforementioned object, in the present invention, when the channel fluctuation is remarkably rapid due to fast fading in multicarrier modulation, the channel fluctuation between symbols or within a burst is relatively decreased without reducing the transmission rate of data, by decreasing the number of subcarrier waves while transmitting data of which the symbol rate per one subcarrier wave is increased.

BEST MODE FOR CARRYING OUT THE INVENTION

Embodiments of the present invention will be described in detail below with reference to the accompanying drawings.

Embodiment 1

Figure 1:
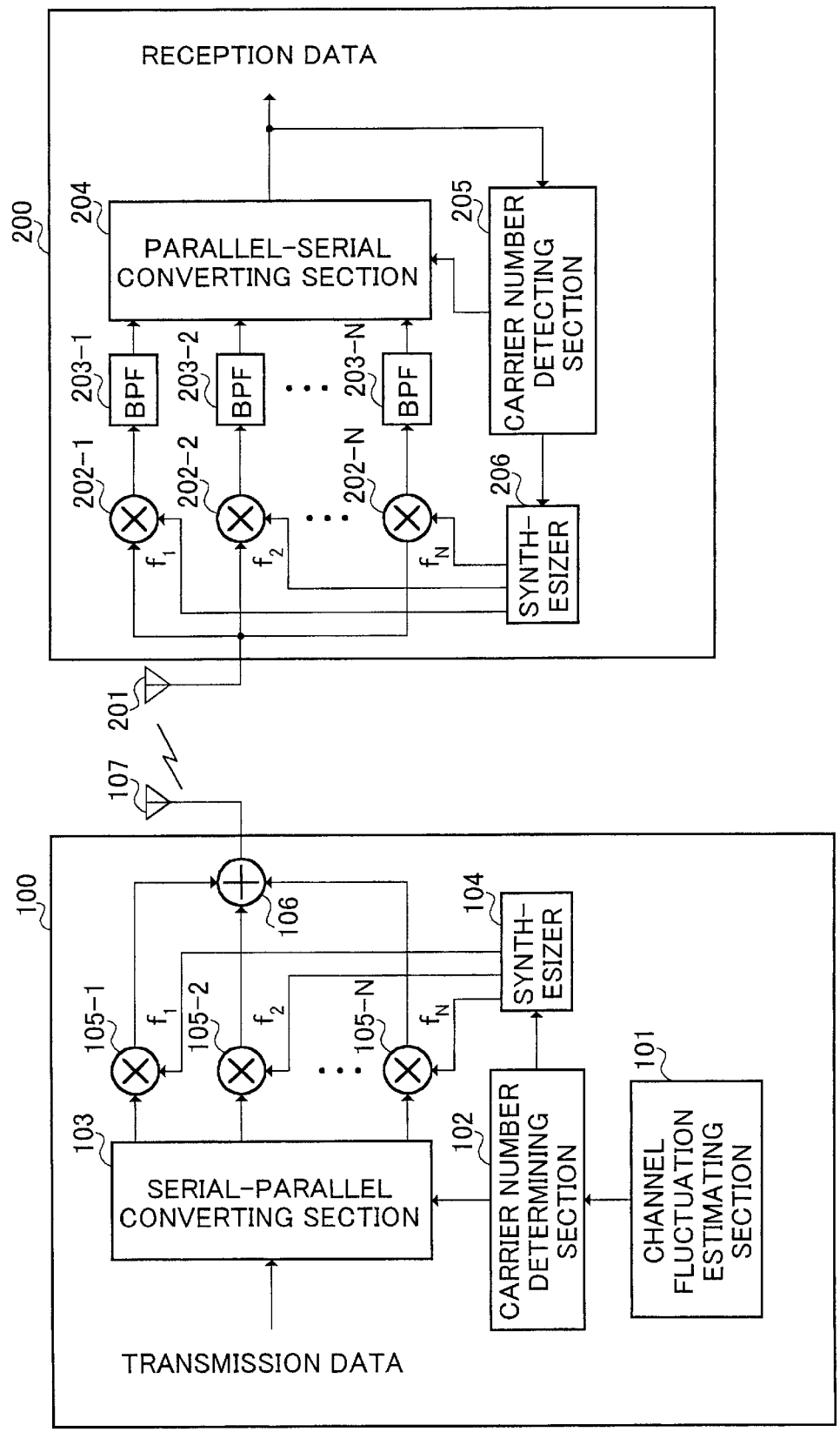
FIG. 1 is a block diagram showing a configuration of a transmitting apparatus and receiving apparatus according to Embodiment 1 of the present invention.

FIG. 1 is a block diagram showing a configuration of a transmitting apparatus and receiving apparatus according to Embodiment 1 of the present invention.

In transmitting apparatus 100 shown in FIG. 1, channel fluctuation estimating section 101 estimates the fluctuation amount of the channel between transmitting apparatus 100 and receiving apparatus 200 and outputs the estimation result to carrier number determining section 102. The receiving level of the signal received by a receiving apparatus, which is not shown, installed in a base station apparatus, etc., together with transmitting apparatus 100, is measured, and a method of estimating based on such a measurement result is given as an estimation method of channel fluctuation amount.

Carrier number determining section 102 determines the number of subcarriers used for transmission of signal based on the estimated channel fluctuation amount. Moreover, carrier number determining section 102, further, determines the symbol period (i.e., symbol rate) per one subcarrier according to the determined number of subcarriers. Specifically, carrier number determining section 102 shortens the symbol period (i.e., increases symbol rate) per one subcarrier while decreasing the number of subcarriers as the channel fluctuation amount increases. Carrier number determining section 102, further, outputs a signal which shows the determined symbol period to serial-parallel converting section 103 while outputting a signal which shows the determined number of subcarriers to serial-parallel converting section 103 and synthesizer 104.

Serial-parallel converting section 103 divides transmission data into data portions of the determined number of subcarriers and outputs the result to multiplication sections 105-1 to 105-N. Moreover, serial-parallel converting section 103 switches multiplication sections 105-1 through 105-N to which the transmission data is output with the determined symbol period.

Synthesizer 104 generates subcarriers $f_1$ to $f_N$ of the determined number of subcarriers and outputs the result to multiplication sections 105-1 to 105-N.

Each of multiplication sections 105-1 to 105-N multiplies transmission data which has been subjected to serial to parallel conversion in serial-parallel converting section 103 by each of the subcarriers $f_1$ to $f_N$ outputted from synthesizer 104, respectively, and signals after being subjected to subcarriers multiplication are outputted to combining section 106.

Combining section 106 combines the signals outputted from multiplication sections 105-1 to 105-N and generates a multicarrier signal which is then transmitted as a radio signal via antenna 107.

In other words, the multicarrier modulation of the transmission data is performed by a series of operations executed in serial-parallel converting section 103, synthesizer 104, multiplication sections 105-1 to 105-N and combining section 106, and the generated multicarrier signal is transmitted to receiving apparatus 200.

In receiving apparatus 200 shown in FIG. 1, on the other hand, each of multiplication sections 202-1 to 202-N carries out the multiplication of the multicarrier signal received by antenna 201 by subcarriers $f_1$ to $f_N$ outputted from synthesizer 206, respectively, and outputs the signal after being subjected to subcarrier multiplication to BPF (Band Pass Filter) 203-1 to 203-N.

Each of BPF 203-1 to 203-N passes only the respective components included inside a specific bandwidth from among all components of the signal outputted from each of multiplication sections 202-1 to 202-N, respectively, and then outputs the result to parallel-serial converting section 204.

Parallel-serial converting section 204 carries out parallel to serial conversion processing for the number of subcarriers which are outputted from carrier number detecting section 205 of the signal which is divided into each subcarrier outputted from BPF 203-1 to 203-N, and restores the originally transmitted data sequence. Thereby, the receiving data is obtained.

Carrier number detecting section 205 detects the number of subcarriers of the multicarrier signal and outputs a signal which shows the subcarriers number to parallel-serial converting section 204 and synthesizer 206. Moreover, the following methods are given as detecting methods of subcarriers number: 1) a method in which a subcarrier number information is multiplexed into a previous frame before changing the subcarrier number and then transmitted by transmitting apparatus 100, and the subcarrier number information is detected from the receiving signal by carrier number detecting section 205. 2) a method in which the subcarriers number information of the aforementioned method 1) together with transmission data are transmitted using different channels. 3) a method in which transmitting apparatus 100 does not transmit the subcarriers number information, but the multicarrier signal is demodulated with a candidate subcarriers number by receiving apparatus 200 and the subcarriers number is then estimated from the demodulation result (for instance, CRC result) by carrier number detecting section 205.

Synthesizer 206 generates subcarriers $f_1$ to $f_N$ for the detected number of subcarriers and outputs the result to multiplication sections 202-1 to 202-N.

Figure 2A:
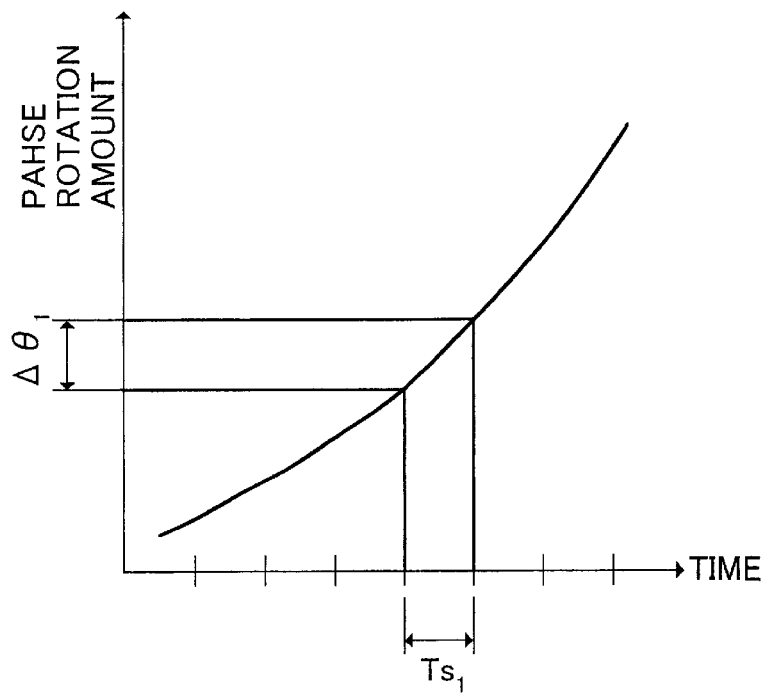
FIG. 2A is a graph illustrating a relation between symbol rate and channel fluctuation amount.
Figure 2B:
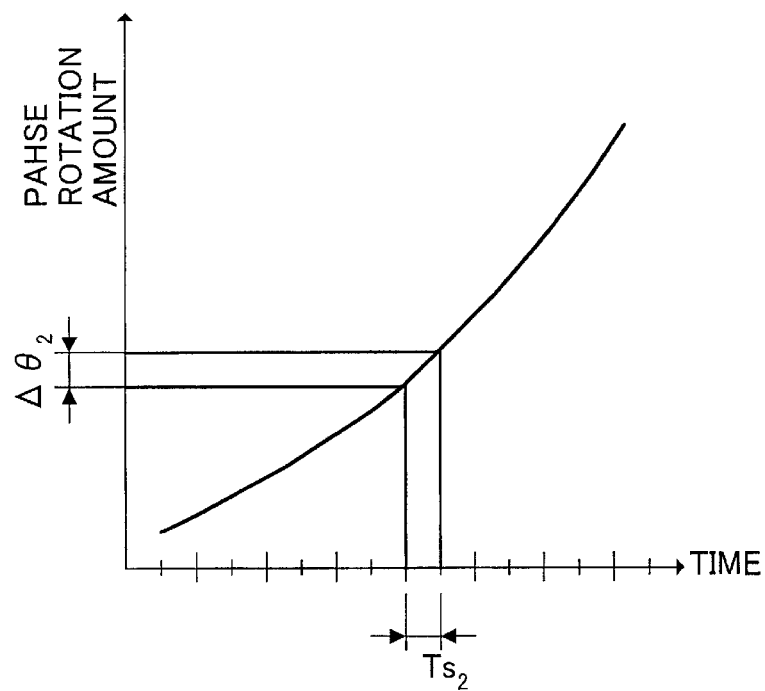
FIG. 2B is a graph illustrating a relation between symbol rate and channel fluctuation amount.

Next, the relation between the symbol rate and channel fluctuation amount will be explained using FIG. 2A and FIG. 2B. The horizontal axis of FIG. 2A and FIG. 2B represents the time and the vertical axis represents the phase rotation amount. Moreover, FIG. 2A shows the case where symbol rate is low (i.e., long symbol period) and FIG. 2B shows the case where symbol rate is high (i.e., short symbol period).

In the case when the symbol rate is low as shown in FIG. 2A, because the transmission time of one symbol (i.e., symbol period) $Ts_1$ becomes long, the phase rotation amount $\Delta\theta_1$ in this period becomes large. As shown in FIG. 2B, on the other hand, when the symbol rate is high, the transmission period of one symbol $Ts_2$ becomes short and the phase rotation amount $\Delta\theta_2$ in this period becomes small. In addition, although the amount of phase rotation of the channel is considered here, but the relation between the time and amplitude variation can be similarly explained.

Thus, because the fluctuation amount of the channel becomes relatively small as increasing the symbol rate (i.e., decreasing symbol period), then, when the channel fluctuation is large, the amount of amplitude variation and the amount of phase rotation of the receiving signal can be reduced in receiving apparatus 200 by decreasing the subcarrier number of the transmission signal and hence increasing the symbol rate per one subcarrier.

Similarly, because the time variations of channel can be slowed down by increasing the symbol rate, it is possible to compensate for the time variations of the phase rotation, etc., by the frequency offset in receiving apparatus 200.

Here, if the number of subcarriers in carrier number detecting section 102 is determined so that the product of symbol period per one subcarrier and the amount of channel fluctuation may reach a constant value, then, a simple calculation processing can determine an optimum number of the subcarriers.

Figure 3A:
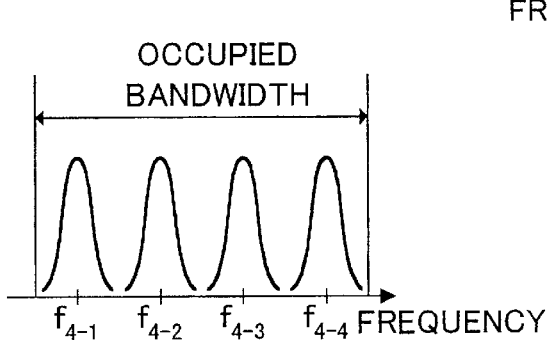
FIG. 3A is a graph illustrating a relation between subcarriers number and frequency bandwidth.
Figure 3B:
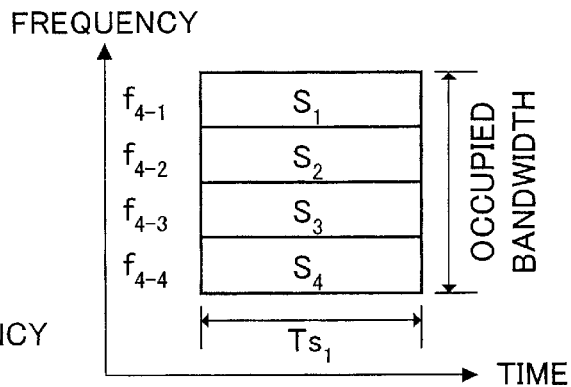
FIG. 3B is a graph illustrating a relation among subcarriers number, frequency bandwidth and symbol rate.
Figure 4A:
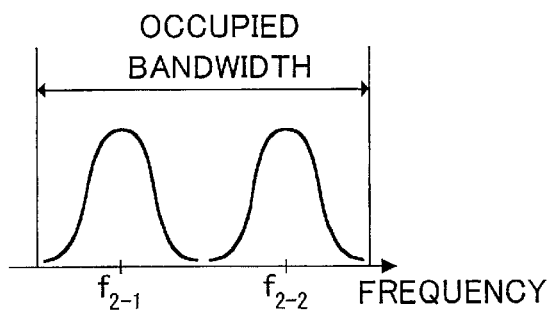
FIG. 4A is a graph illustrating a relation between subcarriers number and frequency bandwidth.
Figure 4B:
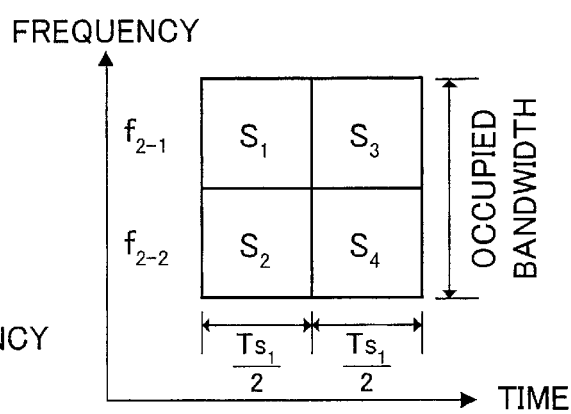
FIG. 4B is a graph illustrating a relation among subcarriers number, frequency bandwidth and symbol rate.
Figure 5A:
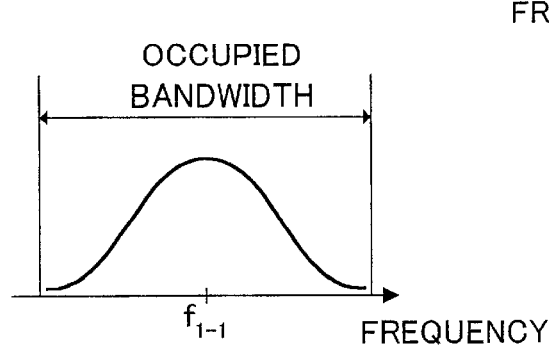
FIG. 5A is a graph illustrating a relation between subcarriers number and frequency bandwidth.
Figure 5B:
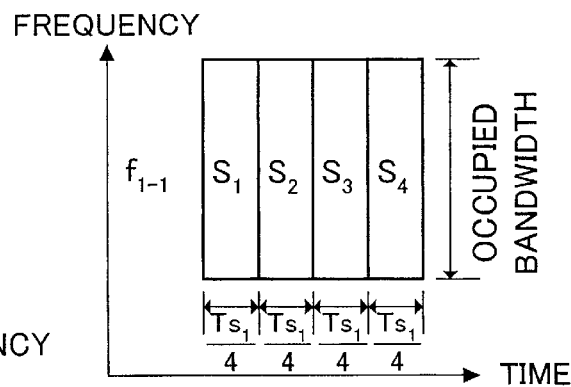
FIG. 5B is a graph illustrating a relation among subcarriers number, frequency bandwidth and symbol rate.

Next, the relation between subcarriers number and frequency bandwidth with symbol rate will be explained using FIG. 3 to FIG. 5. The case of four subcarriers is shown in FIG. 3A and FIG. 3B, the case of two subcarriers is shown in FIG. 4A and FIG. 4B, and the case of one subcarrier is shown in FIG. 5A and FIG. 5B. That is to say, in FIG. 3 to FIG. 5, the symbol rate becomes large (symbol period becomes short) as the figure number increases, and the tolerance over channel fluctuation increases. In addition, it is assumed that transmitting apparatus 100 transmits data of four symbols $S_1$ to $S_4$.

The case when transmitting apparatus 100 carries out transmission using four subcarriers $f_{4-1}$ to $f_{4-4}$ is shown in FIG. 3A, and it is assumed that the symbol period per one subcarrier is $Ts_1$. Therefore, the symbols $S_1$ to $S_4$ are transmitted in symbol period $Ts_1$, as shown in FIG. 3B, using subcarriers $f_{4-1}$ to $f_{4-4}$, respectively.

Moreover, since twice of the frequency bandwidth can be used per each subcarrier in the case when transmitting apparatus 100 carries out transmission using 2 subcarriers $f_{2-1}$ and $f_{2-2}$ as shown in FIG. 4A in comparison with the case of FIG. 3A and FIG. 3B, the symbol period per one subcarrier is $Ts_1/2$. Therefore, each of the symbols $S_1$ to $S_4$ is transmitted in symbol period $TS_1/2$ using subcarriers $f_{2-1}$ and $f_{2-2}$ as shown in FIG. 4B. That is, because the symbol rate becomes twice compared with the case of FIG. 3A and FIG. 3B, transmission speed of data does not deteriorate.

Furthermore, in the case when transmitting apparatus 100 carries out transmission using one subcarrier $f_{1-1}$ as shown in FIG. 5A, the symbol period per one subcarrier is $Ts_1/4$. Thus, each of the symbols $S_1$ to $S_4$ is transmitted in symbol period $Ts_1/4$ using the subcarrier $f_{1-1}$ as shown in FIG. 5B. That is, because the symbol rate becomes four times compared with the case of FIG. 3A and FIG. 3B, transmission speed of data does not deteriorate.

Therefore, in transmitting apparatus 100, by widening the frequency bandwidth of each subcarrier as well as decreasing the number of subcarriers and increasing symbol rate as the fluctuation amount of the channel increases, the fluctuation amount of the channel can be relatively decreased without reducing the data transmission speed. Therefore, it is possible to keep a communication quality at a preferable level even in the case of a remarkably rapid fluctuation of radio channel caused by fast fading, etc.

Still further, in transmitting apparatus 100, because the occupied bandwidth of each of subcarriers $f_{4-1}$ to $f_{4-4}$ is set to ¼ of that of subcarrier $f_{1-1}$ and the occupied frequency bandwidth of each of subcarriers $f_{2-1}$ and $f_{2-2}$ is set to ½ of that of subcarrier $f_{1-1}$, as shown in FIG. 3 to FIG. 5, the whole occupied frequency bandwidth is kept the same even in the case where the number of subcarriers increases.

Figure 6:
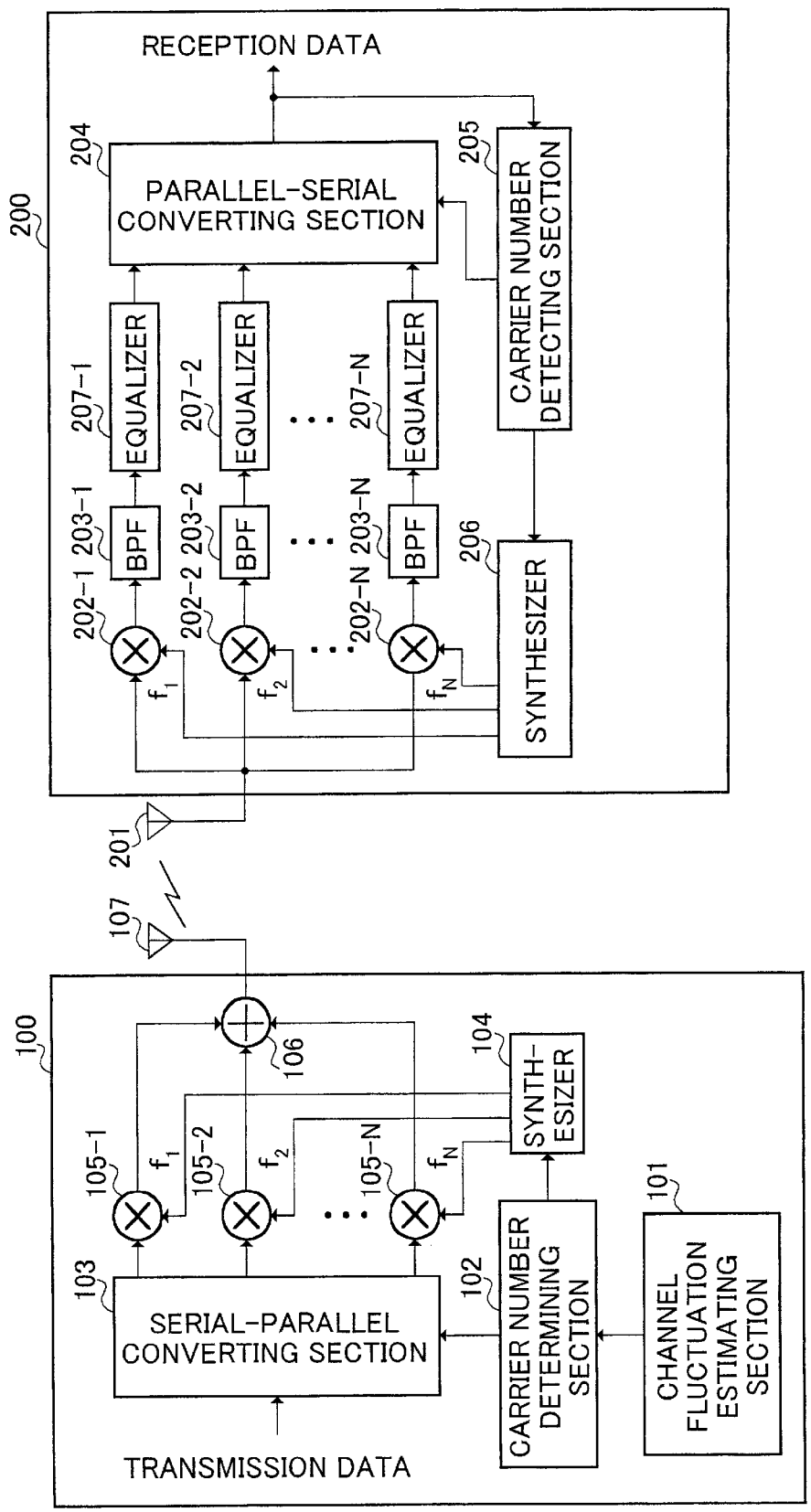
FIG. 6 is a block diagram showing another configuration of a transmitting apparatus and receiving apparatus according to Embodiment 1 of the present invention.

Still further, as shown in FIG. 6, the ability of following the channel fluctuation can be increased by providing the receiving apparatus 200 with equalizers 207-1 to 207-N each of which has tracking function to follow the channel fluctuation for every subcarrier. Thereby, communication quality can be further improved.

Embodiment 2

In OFDM (Orthogonal Frequency Division Multiplexing) modulation, a transmitting apparatus according to the present embodiment carries out signal transmission after decreasing the number of subcarriers as the channel fluctuation increases.

Here, OFDM is a kind of the multicarrier modulation methods, in such a modulation method each subcarrier is in orthogonal relation to others.

Figure 7:
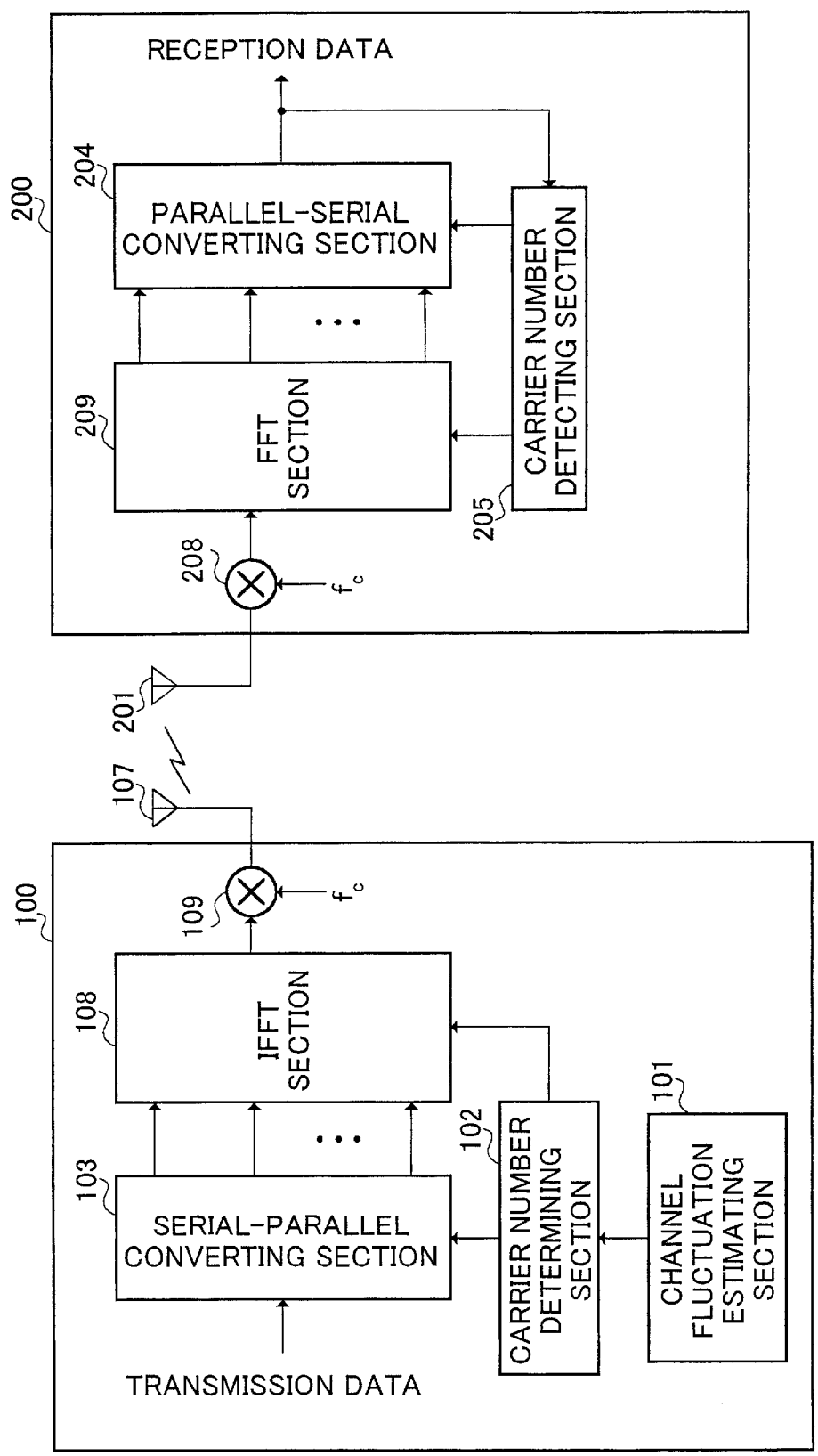
FIG. 7 is a block diagram showing a configuration of a transmitting apparatus and receiving apparatus according to Embodiment 2 of the present invention.

FIG. 7 is a block diagram showing a configuration of a transmitting apparatus and receiving apparatus according to Embodiment 2 of the present invention. Moreover, in transmitting apparatus and receiving apparatus shown in FIG. 7, the same components as those of FIG. 1 are assigned the same reference numerals and explanations thereof are omitted.

As shown in FIG. 7, carrier number determining section 102 in transmitting apparatus 100 outputs a signal which shows the determined number of subcarriers to serial-parallel converting section 103 and IFFT (Inverse Fast Fourier Transform) section 108 while outputs a signal which shows the determined symbol period to serial-parallel converting section 103.

IFFT section 108 performs IFFT processing with the number of subcarriers on the transmission data subjected to serial to parallel conversion in serial-parallel converting section 103, and generates OFDM signal. The generated OFDM signal is outputted to multiplication section 109.

Multiplication section 109 multiplies the OFDM signal by a subcarrier frequency $f_c$, and the OFDM signal after being subjected to subcarrier frequency multiplication is transmitted as a radio signal via antenna 107.

That is to say, OFDM modulation of the transmission data is performed by a series of operations executed in serial-parallel converting section 103, IFFT section 108 and multiplication section 109.

In receiving apparatus 200 shown in FIG. 7, on the other hand, multiplication section 208 multiplies the OFDM signal received via antenna 201 by subcarrier frequency $f_c$, and outputs the OFDM signal subjected to subcarrier frequency multiplication to FFT (Fast Fourier Transform) section 209.

FFT section 209 performs FFT processing on OFDMA signal with the number of subcarriers detected in carrier number detecting section 205, and divides the OFDM signal into signals each of subcarrier frequency. The signal after being divided is outputted then to parallel-serial converting section 204.

Carrier number detecting section 205 detects the subcarriers number of OFDM signal, and outputs a signal which shows subcarriers number to parallel-serial converting section 204 and FFT section 209.

Therefore, because it is possible to overlap the spectrum of each subcarrier by adopting the OFDM modulation method as a multicarrier modulation method, the effect of Embodiment 1 can be obtained, and the frequency utilization efficiency can also be improved.

Embodiment 3

In the present embodiment, the transmitting apparatus transmits data in accordance with the subcarriers number determined by the receiving apparatus, instead of a transmitting apparatus determining the subcarriers number.

Figure 8:
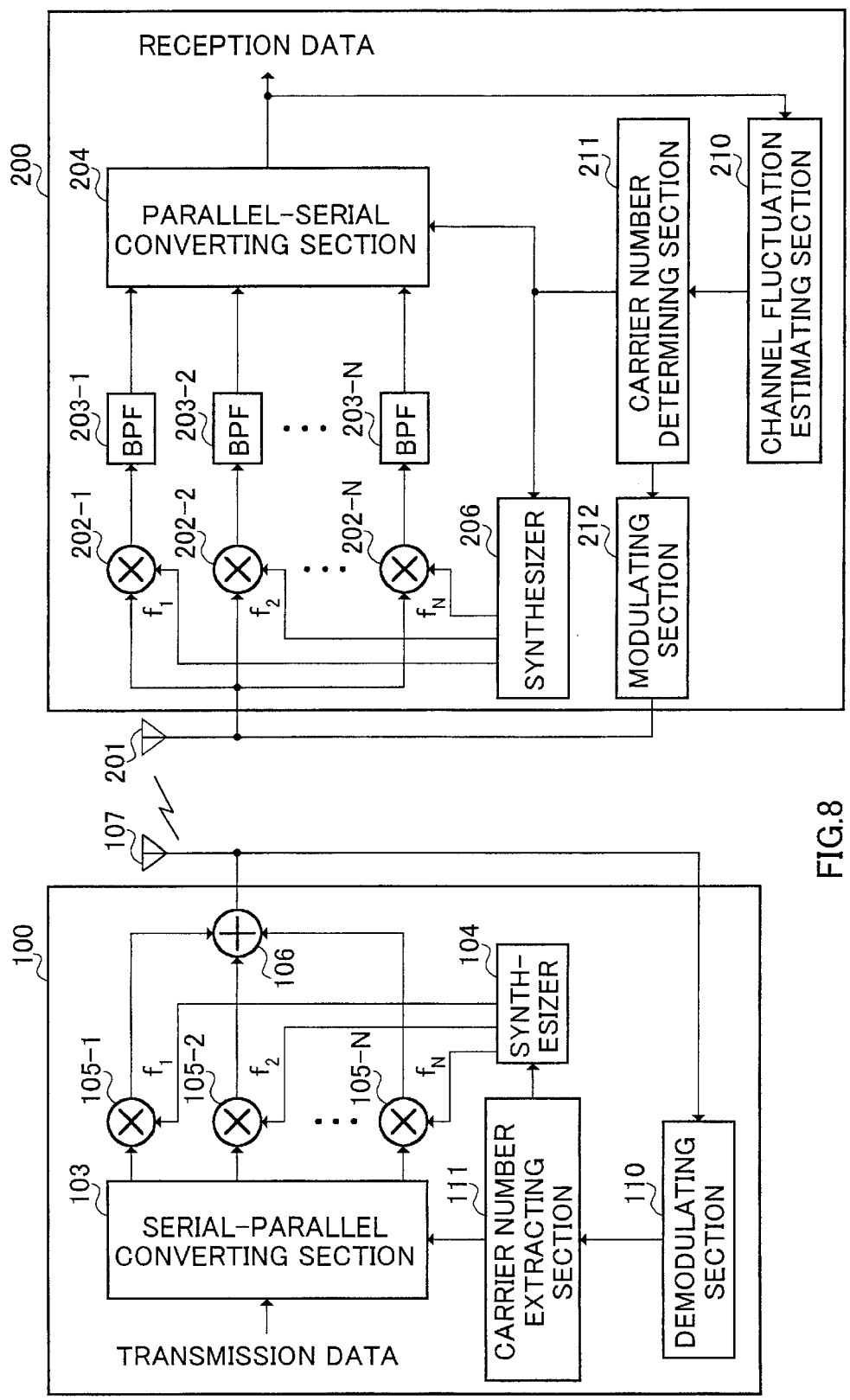
FIG. 8 is a block diagram showing a configuration of a transmitting apparatus and receiving apparatus according to Embodiment 3 of the present invention.

FIG. 8 is a block diagram showing a configuration of a transmitting apparatus and receiving apparatus according to Embodiment 3 of the present invention. In transmitting apparatus and receiving apparatus shown in FIG. 8, the same components as those of FIG. 1 are assigned the same reference numerals and explanations thereof are omitted.

In receiving apparatus 200 shown in FIG. 8, channel fluctuation estimating section 210 estimates the channel fluctuation amount of a multicarrier signal, and outputs the estimation result to carrier number determining section 211.

Carrier number determining section 211 determines the number of subcarriers used in the signal transmitted by transmitting apparatus 100 based on estimated channel fluctuation amount. Specifically, carrier number determining section decreases the number of subcarriers as the channel fluctuation amount increases. Further, carrier number determining section 211 outputs a signal which shows the determined number of subcarriers to parallel-serial converting section 204, synthesizer 206 and modulating section 212.

Modulating section 212 modulates the signal which shows the number of subcarriers and transmits the modulated signal as a radio signal via antenna 201.

On the other hand, in transmitting apparatus 100 shown in FIG. 8, demodulating section 110 demodulates the signal which shows the number of subcarriers and which is received by antenna 107, then outputs the result to carrier number extracting section 111.

Carrier number extracting section 111 extracts the information which shows subcarriers number from the demodulated signal, and outputs the signal that shows the subcarriers number to serial-parallel converting section 103 and synthesizer 104. Moreover, carrier number extracting section 111 determines the symbol period (i.e., symbol rate) per one subcarrier according to the extracted number of subcarriers, and outputs the signal which shows the determined symbol period to serial-parallel converting section 103.

Thus, the subcarriers number is determined in receiving apparatus, and it is possible to determine the subcarriers number based on the actual channel fluctuation amount of channel directed from transmitting apparatus to receiving apparatus by transmitting from transmitting apparatus the data in accordance with the subcarriers number determined in receiving apparatus. Thereby, the transmitting apparatus can transmit data using subcarriers number that makes the symbol rate the easiest to be decoded in receiving apparatus.

In addition, it is possible to use an OFDM modulation as a multicarrier modulation in the present embodiment in the same way as indicated in Embodiment 2.

Moreover, when receiving apparatus 200 and transmitting apparatus 100 are integrated together, it is possible to carry out transmission after multiplexing the information which shows subcarriers number that is outputted from carrier number determining section 211 in the transmission data.

Furthermore, due to utilization of different frequency bandwidths in uplink channel and downlink channel, the present embodiment is especially effective to mobile communication system which uses FDD (Frequency Division Duplex) method in which the amount of channel fluctuation of the uplink channel is different from that of downlink channel.

Embodiment 4

In Embodiments 1–3 the case where determining the number of subcarriers used for transmission based only on channel fluctuation amount is explained. However, if data is transmitted with an increased symbol rate per one subcarrier and with a decreased number of subcarriers as the channel fluctuation amount increases, the period in which a reception period will undesirably be long as adjacent symbols before and after are overlapped because of a shortened symbol period per one subcarrier.

That is to say, although it is possible to decrease phase rotation amount and amplitude variation amount in a receiving apparatus when the number of subcarriers is decreased, but the inter-symbol interference due to multipath becomes large. Therefore, determination of the number of subcarriers used for transmission based only on the amount of channel fluctuation produces a problem of losing the advantage of multicarrier modulation method which has the tolerance for delay signals. In other words, determination of the number of subcarriers used for transmission based only on the amount of channel fluctuation, on the contrary, increases an error rate and deteriorates the communication quality.

Figure 9:
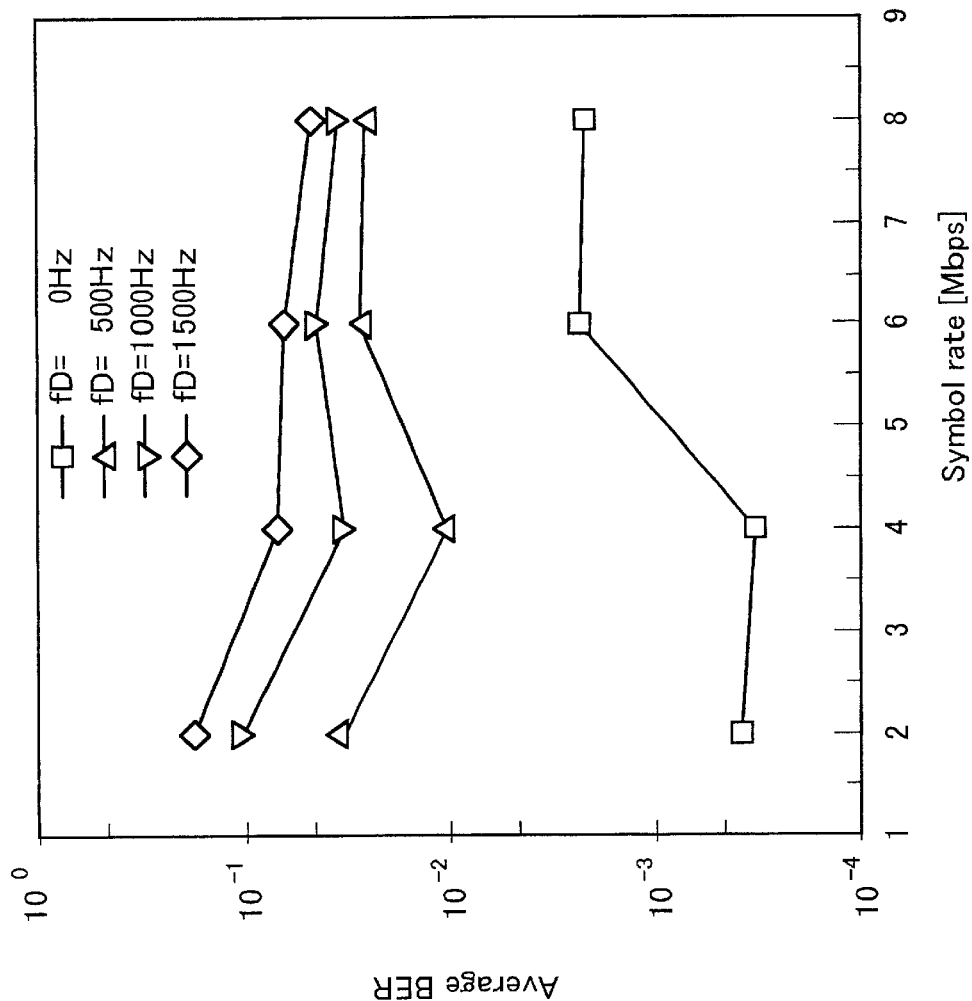
FIG. 9 is a graph showing a relation between symbol rate and error rate.

Moreover, the graph shown in FIG. 9 is a graph showing the relation between symbol rate and average bit error rate at every channel fluctuation amount fD (0 Hz, 500 Hz, 1000 Hz, 1500 Hz) in the case where there is a delay signal of a delay time τ. In FIG. 9, although the horizontal axis represents symbol rate, it is possible to regard the horizontal axis as subcarriers number because in the present invention the symbol rate per one subcarrier is increased when the number of subcarriers is decreased. That is, it is possible to regard in FIG. 9 that the larger the symbol rate is the smaller the subcarriers number. For example, if symbol rate=8 Mbps is related to subcarrier number=1, then, it is possible to know that symbol rate=4 Mbps relates to subcarriers number=2 and symbol rate=2 Mbps relates to subcarriers number=4.

As shown in FIG. 9, there exists a subcarriers number that minimize the bit error rate at every amount of channel fluctuation. In FIG. 9, for instance, in case where fD=1500 Hz relates to subcarrier number=1, fD=1000 Hz, fD=500 Hz and FD=0 Hz relate to subcarriers number=2, the error rate is minimized.

Moreover, since the error rate characteristic is changed according to delay time of delay signals, there exists in FIG. 9 a plurality of error rate characteristics corresponding to a plurality of delay time. That is, there is a plurality of subcarriers numbers that minimize error rate according to channel fluctuation amount for every delay time of delay signals. In other words, it is possible to determine an optimum subcarriers number that minimizes error rate from both delay time of delay signal and channel fluctuation amount.

Therefore, in the present embodiment, an optimum subcarriers number that minimizes error rate is determined based on both channel fluctuation amount and delay time of the delay signal.

Figure 10:
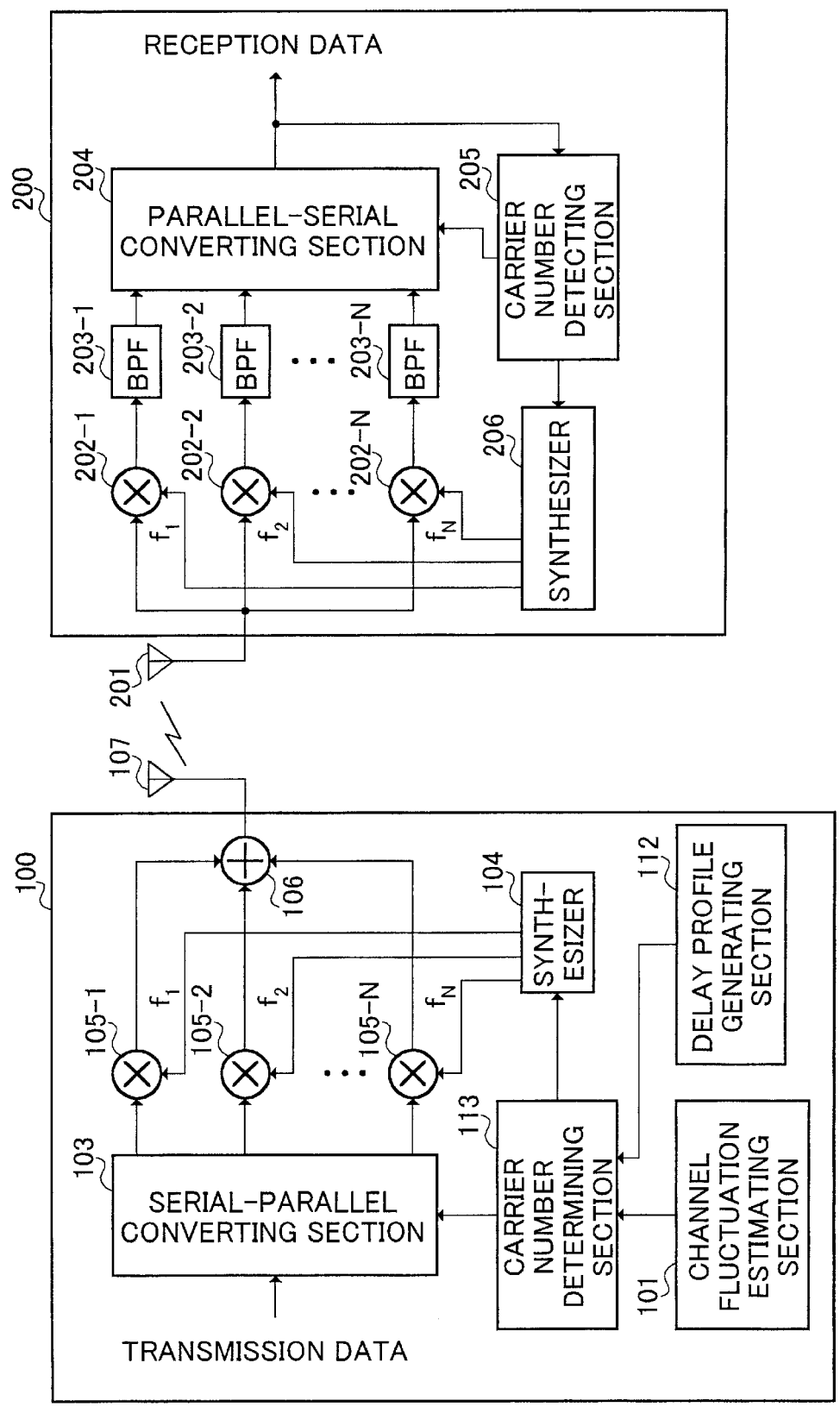
FIG. 10 is a block diagram showing a configuration of a transmitting apparatus and receiving apparatus according to Embodiment 4 of the present invention.

FIG. 10 is a block diagram showing a configuration of a transmitting apparatus and receiving apparatus according to Embodiment 4 of the present invention. In transmitting apparatus and receiving apparatus shown in FIG. 10, the same components as those of FIG. 1 are assigned the same reference numerals and explanations thereof are omitted.

In FIG. 10, the configuration of receiving apparatus 200 is completely the same as that of FIG. 1, and transmitting apparatus 100 adopts the configuration in which delay profile generating section 112 is added to that of FIG. 1.

Delay profile generating section 112 generates a delay profile of signals received by a not-shown receiving apparatus which is installed in transmitting apparatus 100 in a base station apparatus, etc., and outputs the result to carrier number determining section 113.

Carrier number determining section 113 has a reference table in which numbers of subcarriers that minimize the error rate are determined from channel fluctuation amount and delay time of delay signals. Then, carrier number determining section 113 determines the number of subcarriers based on channel fluctuation amount and delay time collected from delay profile referring to the reference table. Moreover, carrier number determining section 113 determines the symbol period (i.e., symbol rate) per one subcarrier according to determined subcarriers number. Then, carrier number determining section 113 outputs a signal which shows determined number of subcarriers to serial-parallel converting section 103 and synthesizer 104 while outputs a signal which shows determined symbol period to serial-parallel converting section 103.

Accordingly, it is possible to keep the preferable good communication quality in receiving apparatus 200 because the determined subcarriers number is the subcarriers number of the optimum symbol rate with which receiving apparatus 200 can easily perform decoding.

In addition, the subcarriers number of the optimum symbol rate with which receiving apparatus 200 can easily perform decoding can be determined with still more sufficient accuracy by preparing the reference table considering not only the delay time but also the path model by which the delay time and level of the delay signal of each path are modeled.

Moreover, it is possible to use an OFDM modulation as a multicarrier modulation in the present invention in the same way as indicated in Embodiment 2.

Further, in the present embodiment it is possible to determine the subcarriers number in receiving apparatus and transmitting apparatus which transmits data based on subcarriers number determined in receiving apparatus in the same way as indicated in Embodiment 3.

Still further, it is possible to apply transmitting apparatus and receiving apparatus according to Embodiments 1 to 4 in a base station apparatus or communication terminal apparatus that carries out radio communications with this base station apparatus which are used in a radio communication system.

In a radio transmission apparatus and radio transmission method using a multicarrier modulation according to the present invention as described above, it is possible to keep the preferable good communication quality without reducing data transmission speed even in the case of the remarkably rapid fluctuation of radio channel caused by fast fading, etc., because the subcarriers number corresponds to channel fluctuation amount and symbol rate are optimally modified.

This application is based on the Japanese Patent Application No. 2000-334451 filed on Nov. 1, 2000, entire content of which is expressly incorporated by reference herein.

Industrial Applicability

The present invention is applicable to a base station apparatus and communication terminal apparatus used in a mobile communication system.

What is claimed is:

1. A radio transmitting apparatus comprising:
   a modulator that modulates, after dividing data, the divided data with respective subcarries of different frequencies by performing inverse Fourier transform processing of the divided data;
   a determiner that determines the number of subcarriers used by said modulator for modulating the divided data and for determining a symbol rate for each subcarrier; and
   a transmitter that transmits a signal comprising the subcarriers modulated by said modulator.

2. The radio transmitting apparatus according to claim 1, wherein said determiner increases the symbol rate for each subcarrier while reducing the number of subcarriers as the amount of channel fluctuation increases.

3. The radio transmitting apparatus according to claim 1, wherein said determiner determines the number of subcarriers so as to minimize an error rate resulting from the amount of channel fluctuation and a signal delay time.

4. The radio transmitting apparatus according to claim 1, wherein said determiner determines the number of subcarriers by referring to a table in which the number of subcarriers is specified based on the channel fluctuation amount and a signal delay time.

5. The radio transmitting apparatus according to claim 1, wherein said determiner extracts information, identifying the number of subcarriers, from a signal transmitted from a communication partner.

6. A base station apparatus comprising the radio transmitting apparatus according to claim 1.

7. A communication terminal apparatus comprising the radio transmitting apparatus according to claim 1.

8. A radio receiving apparatus, which transmits a signal to a radio transmitting apparatus having a modulator that modulates, after dividing data, the divided data with respective subcarriers of different frequencies by performing inverse Fourier transform processing of the divided data, a first determiner that determines the number of subcarriers used by said modulator for modulating the divided data and for determining a symbol rate for each subcarrier, and a transmitter that transmits a signal comprising the subcarriers modulated by said modulator, wherein said first determiner extracts information identifying the number of subcarriers from the signal transmitted by said radio receiving apparatus, said radio receiving apparatus comprising:
   an estimator that estimates an amount of channel fluctuation in a channel directed from said radio transmitting apparatus towards said receiving apparatus;
   a second determiner that determines the number of subcarriers based on the channel fluctuation amount; and
   a transmitter that transmits the signal including said information to said radio transmitting apparatus.

9. A base station apparatus provided with a radio receiving apparatus according to claim 8.

10. A communication terminal apparatus comprising the radio receiving apparatus according to claim 8.

11. A radio communication method, comprising:
    determining a number of subcarriers used for a multicarrier modulation, where divided data is modulated with respective subcarriers of different frequencies by performing inverse Fourier transform processing of the divided data, based on an amount of channel fluctuation; and
    changing a symbol rate for each subcarrier according to the number of subcarriers.

* * * * *